(12) United States Patent
Desbiens

(10) Patent No.: US 7,500,683 B2
(45) Date of Patent: Mar. 10, 2009

(54) FILING CABINET DOLLY

(76) Inventor: Benoit Desbiens, 7801, Rue Bodinier, D'Anjou, Quebec (CA) H1K 1C2

( * ) Notice: Subject to any disclaimer, the term of this patent is extended or adjusted under 35 U.S.C. 154(b) by 216 days.

(21) Appl. No.: 11/483,543

(22) Filed: Jul. 11, 2006

(65) Prior Publication Data
US 2008/0012259 A1    Jan. 17, 2008

(51) Int. Cl.
*B62B 3/00* (2006.01)
(52) U.S. Cl. ............................ 280/47.34; 280/79.11
(58) Field of Classification Search ............. 280/79.11, 280/79.3, 47.34, 47.41, 47.29; 414/467, 414/539, 540, 546
See application file for complete search history.

(56) References Cited

U.S. PATENT DOCUMENTS

| | | | | |
|---|---|---|---|---|
| 3,750,810 A | * | 8/1973 | Stanfill | 414/421 |
| 4,435,115 A | * | 3/1984 | Orstad et al. | 414/490 |
| 4,536,033 A | * | 8/1985 | Allen | 298/2 |
| 4,893,824 A | | 1/1990 | Turek et al. | |
| 5,017,080 A | | 5/1991 | Thorndike et al. | |
| 5,503,424 A | * | 4/1996 | Agopian | 280/651 |
| 6,742,790 B2 | * | 6/2004 | Seagraves et al. | 280/47.34 |
| 6,880,837 B2 | | 4/2005 | Nandram et al. | |
| 7,014,197 B2 | * | 3/2006 | Baldwin et al. | 280/47.27 |
| 2005/0212242 A1 | | 9/2005 | Cheng | |

* cited by examiner

*Primary Examiner*—Christopher P Ellis
*Assistant Examiner*—Brian Swenson
(74) *Attorney, Agent, or Firm*—Equinox Protection; Franz Bonsang, Patent Agent

(57) ABSTRACT

A filing cabinet dolly provides a wheeled framework within and upon which a filing cabinet may be disposed for transport, the framework including a vertically power-assisted movable platform for accommodating the cabinet in a stable orientation.

16 Claims, 4 Drawing Sheets

FILING CABINET DOLLY

FIELD OF THE INVENTION

The present invention relates to a filing cabinet dolly of the kind employed to facilitate moving the cabinet either with contents or without from one location to another.

BACKGROUND OF THE INVENTION

It is well known that considerable difficulty is encountered when attempting to reposition a filing cabinet, particularly once it has some contents, in view of its cumbersome nature which is aggravated by the absence of any real handholds for maneuvering the cabinet from one place to another and emplacing it correctly at its new location. Especial difficulty is experienced when moving lateral filing cabinets which can easily twist and deform during manhandling thereby potentially causing damage or at least compromising structural integrity.

It is well known to use what is commonly known as a dolly consisting of a small wheeled platform provided with an appropriate handle giving sufficient leverage and mechanical advantage to enable an operator to load the platform and to tilt the same and then to wheel the load from one location to another. For relatively small items and also for those with a degree of inbuilt stability such a dolly is fit for the purpose. However, for the task of moving a filing cabinet such a dolly is not so convenient or indeed safe in view of the awkwardness and weight involved.

Various proposals have been made to address the problem of moving a lateral filing cabinet and in particular U.S. Pat. No. 6,880,837 to Nadram et al discloses a dolly designed for this purpose. However, this prior art dolly suffers from a number of disadvantages including the orientation of the cabinet when loaded, namely that its narrower side is embraced by the dolly thereby giving rise to instability during cabinet loading and unloading movements. Furthermore, this dolly has no lifting feature and thus the effort required by the operator remains significant.

Accordingly, there is a need for an improved filing cabinet dolly that avoids the disadvantages associated with existing and conventional dollies as outlined supra.

SUMMARY OF THE INVENTION

It is therefore a general object of the present invention to provide an improved filing cabinet dolly that facilitates the emplacement of a filing cabinet thereon and its safe and stable transportation from one place to another.

An advantage of the present invention is that the dolly is so formed as to accommodate the longest width dimension of the cabinet across the breadth of the dolly when presented to the front of the cabinet.

Another advantage of the present invention is that the dolly provides a platform of significant extent to afford a stable support for the filing cabinet.

A further advantage of the present invention is that the platform of the dolly has an elevating mechanism to lift the cabinet out of contact with the floor to give more than adequate clearance to achieve ease of movement.

Yet a further advantage of the present invention is that the platform of the dolly, when in the elevated position, is still low enough to simply allow the filing cabinet to simply abut onto the floor thus prevent the filing cabinet from falling and collapsing in case of tilting.

Accordingly the invention provides a filing cabinet dolly comprising a mobile framework mounted on wheels and defining an open front end for enabling access therethrough to a long side of a filing cabinet located on a floor surface, a platform associated with a closed rear end of the framework remote from the open end and provided with a slide, actuating means adapted in use to move the slide and thereby raise or lower the platform while keeping the platform substantially parallel to the floor surface with the wheels permanently in contact therewith, a handle disposed on the framework, and releasable restraining means adapted in use to retain the cabinet *in situ* on the platform, the platform, when in a lowered position, being substantially in contact with the floor surface.

The wheeled framework of the filing cabinet dolly may conveniently be constructed of a lightweight material, e.g. aluminum, and may be advantageously formed of hollow square section tubing with the various elements thereof suitably welded together, and mounted on four caster wheels.

The framework preferably has a closed rear end formed of two spaced apart horizontal rails with vertical side limbs extending therebetween to give a generally rectangular form to that end. Side bars extend orthogonally from the relatively lower rail to terminate at an appropriate distance therefrom and thus form the open front end of the framework. A handle is provided at one side of the framework and is upstanding from one side bar and one of the limbs forming the rectangular rear end.

The rear end of the framework has two guide rods extending vertically between the two rails thereof at spaced apart locations lengthwise of the rails, and the actuating means is disposed centrally between the guide rods and the side limbs and the base of the actuating means is supported by the relatively lower rail.

The actuating means may be a self-contained hydraulically operable bottle jack. In the alternative, a rack and pinion arrangement may be provided as the actuating means for moving the slide and thus the platform.

The platform comprises a base support with a back upstanding therefrom and triangular side members giving the platform the resemblance of a front-end loader bucket. The rear side of the back of the platform is provided with the slide which consists of two guides engaging the guide rods for rectilinear movement therealong. The back of the platform has an abutment with which the actuating means cooperates. Stop means are conveniently provided on the back of the platform to engage the top rail to limit the range of vertical movement of the platform.

Conveniently, the framework is provided with buffer means for positioning the filing cabinet on the platform. The buffer means may be wedge-shaped and affixed to the side bars such as to extend partially into the space of the open end to provide in use guides and supports for the filing cabinet when mounted within and on the dolly.

The releasable restraining means may consist of a pivoted lever attached to the handle and moveable between a parked non-operative position adjacent the handle and an operative restraining position orthogonal thereto, in use the lever providing a lock preventing the cabinet from moving out of its location on the dolly.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE PREFERRED EMBODIMENTS

Figure 1:
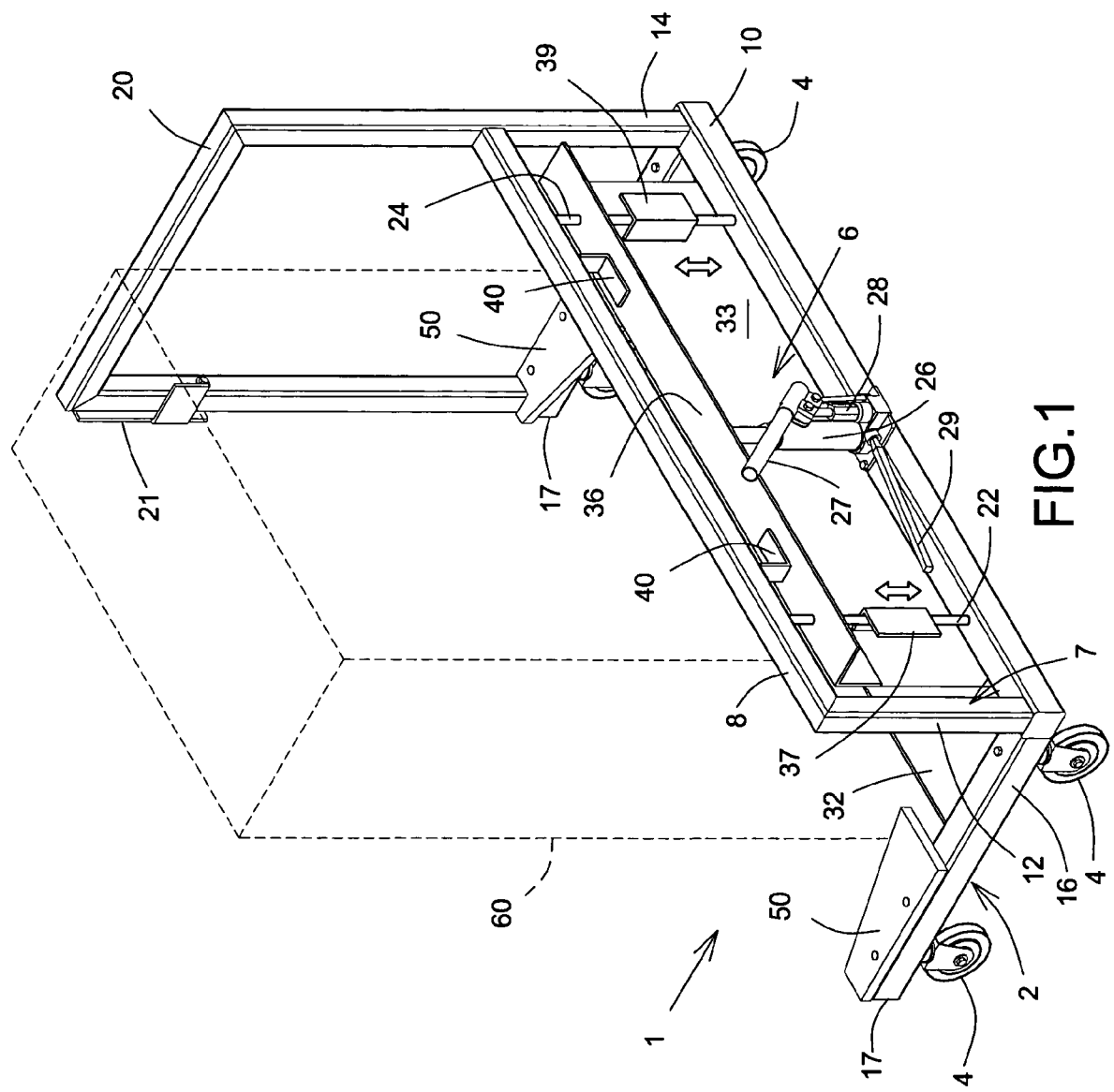
FIG. 1 is a rear perspective view of a filing cabinet dolly in accordance with an embodiment of the present invention.
Figure 2:
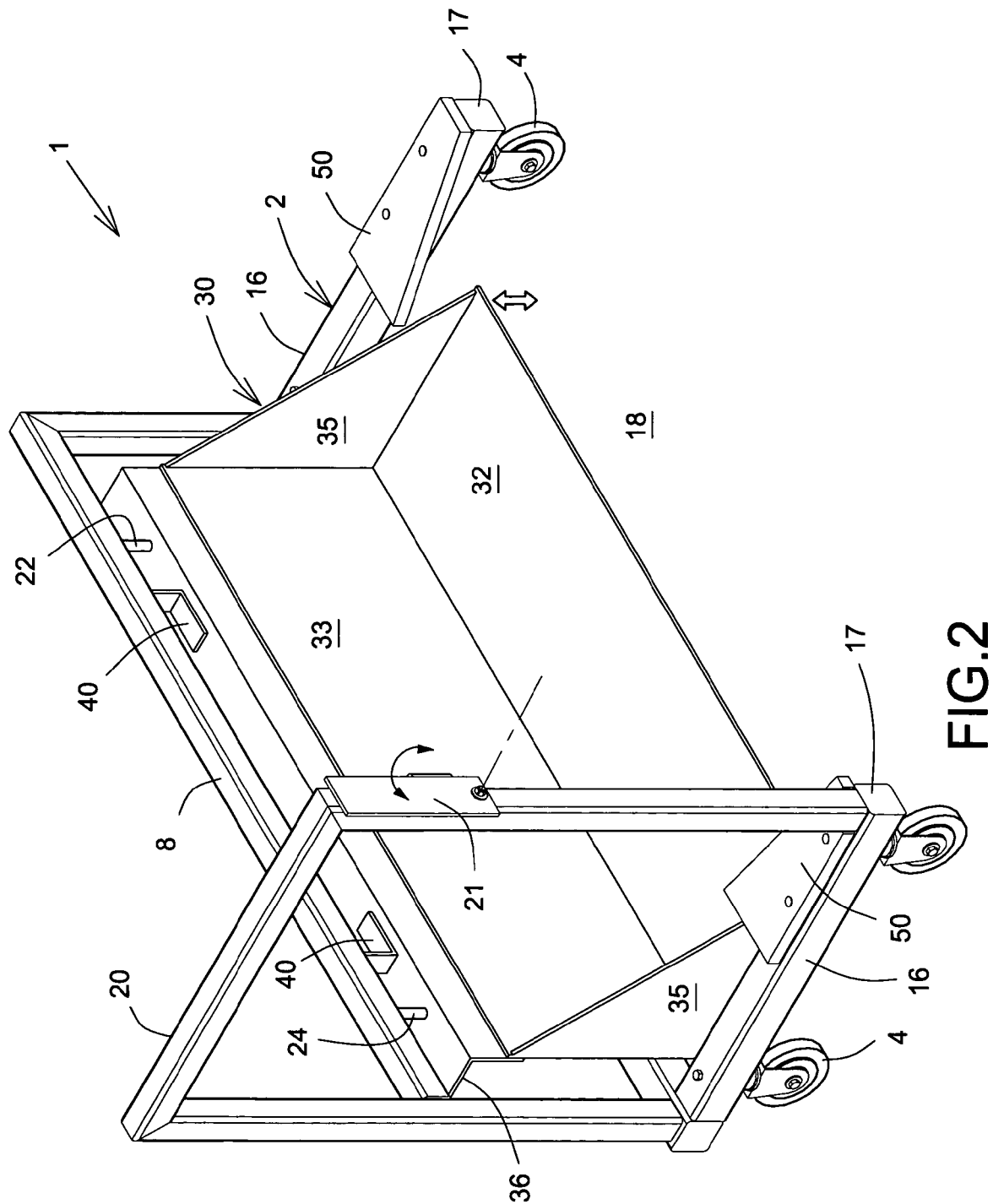
FIG. 2 is a front perspective view of the embodiment of FIG. 1.
Figure 3:
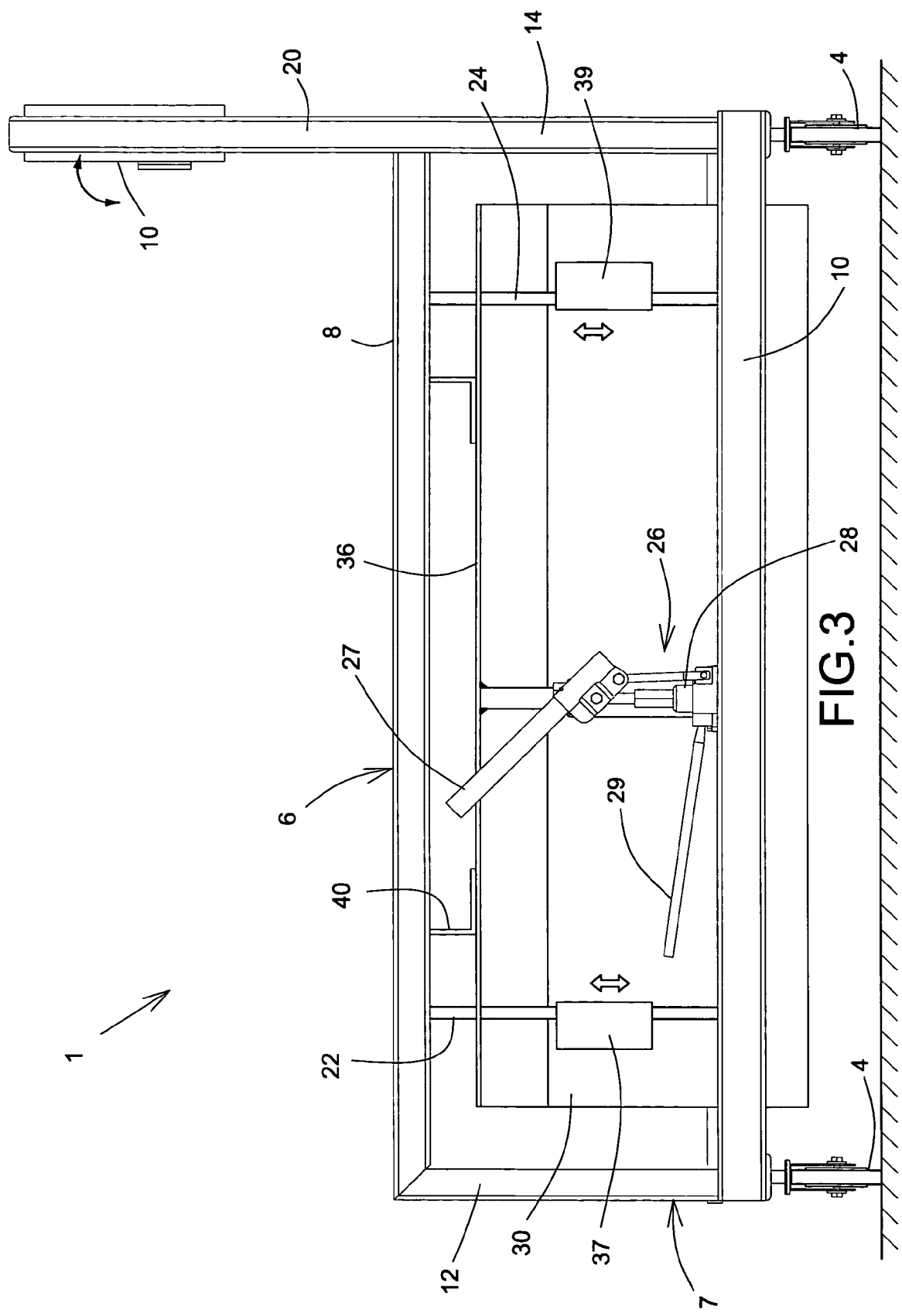
FIG. 3 is a rear elevation of the embodiment of FIG. 1.

With reference to the annexed drawings the preferred embodiment of the present invention will be herein described for indicative purpose and by no means as of limitation.

Referring to the drawings there is shown generally at 1 a filing cabinet dolly in accordance with an embodiment of the present invention comprising a mobile wheeled framework 2 provided with four casters 4 at each of four corners. The framework 2 is constructed of lightweight metal, for example aluminum, and is formed of hollow square section tubing suitably welded at appropriate joints.

The framework 2 has a closed rear end 6 comprising a rectangular structure 7 with two spaced apart horizontal rails 8, 10 and two side limbs 12, 14 bridging each of the rails at their ends. Side bars 16 extend orthogonally from the relatively lower rail 10 at each end of the rectangular structure terminating in free ends 17 between which is defined an open front end 18. The casters 4 are mounted on the underside of the bars 16 to provide stable mobility for the framework. A handle 20 is provided on one side of the framework 2 as shown. The handle could also be releasably mounted on the framework 2 although not illustrated. A pivoted stop lever 21 is attached to a relatively upper part of the handle 20 as shown for a purpose to be described hereinafter.

The rectangular structure 7 is provided with two guide rods 22, 24 spaced apart between the side limbs 12, 14 and extending between and fixed to the rails 8, 10. A conventional self-contained hydraulic bottle jack 26 is mounted on the lower rail 10 and has an actuating handle 27 for a pump 28 to elevate the jack and a release lever 29 for relieving pressure in the jack when its retraction is required.

A platform 30 comprises a horizontal base support 32 with an upstanding back 33 and triangular sides 35. A slide in the form of two guides 37, 39 is attached to the rear of the back 33 with each guide engaging a rod 22, 24 respectively. The back 33 has an angle iron 36 secured along its top edge and the bottle jack abuts the underside thereof as shown. Further spaced apart stops 40 are provided on the top of the angle iron 36.

Wedge-shaped buffers 50 are provided on the side bars 16 as shown and are intended in use to provide a guide and a restraint for the sides of the filing cabinet depicted in outline form 60 in FIGS. 1, 4, 5 and 6. The buffers 50 may be produced from a material that will not damage the cabinet and accordingly may be a plastics material or other material of low friction, for example TEFLON®.

Figure 6:
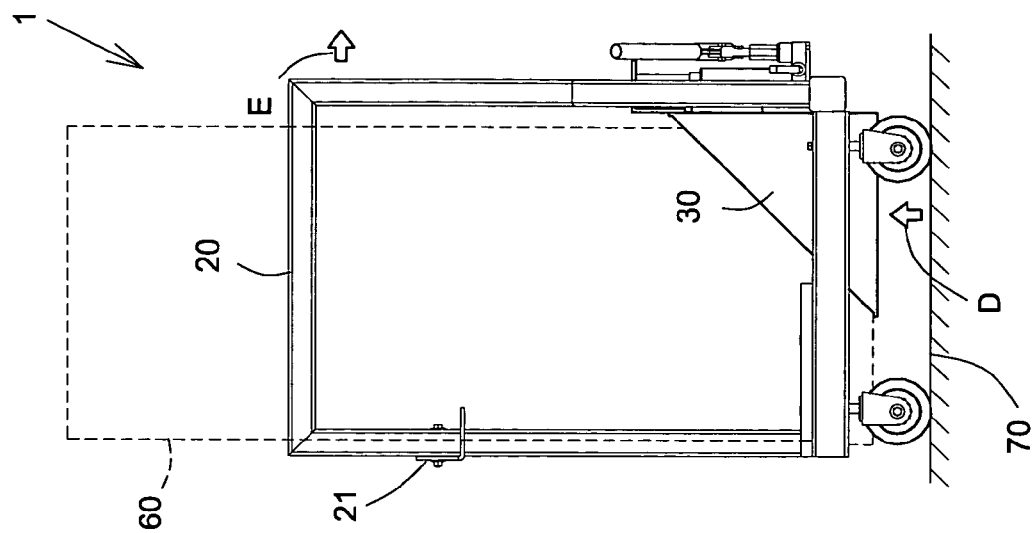
FIGS. 4, 5 and 6 show the three steps whereby a filing cabinet is loaded onto the dolly.
Figure 5:
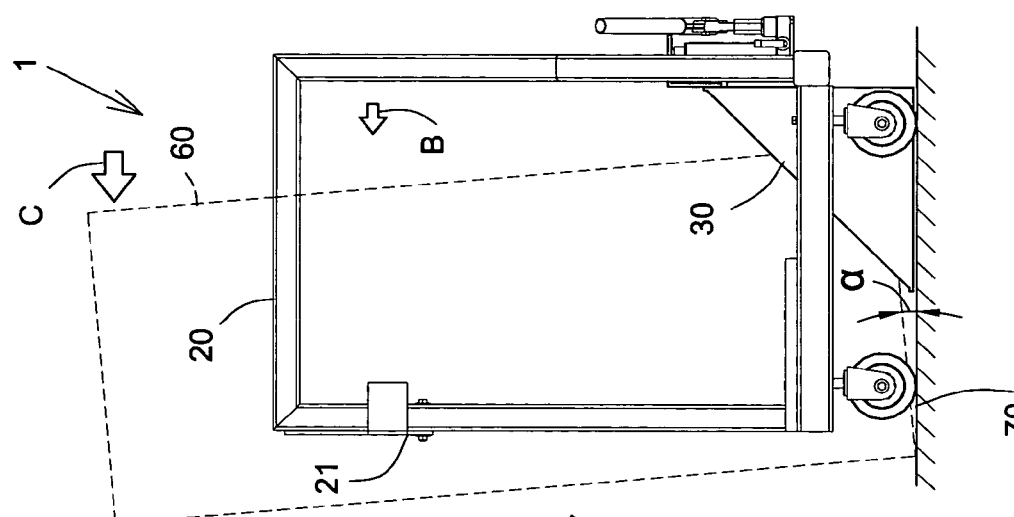
Figure 4:
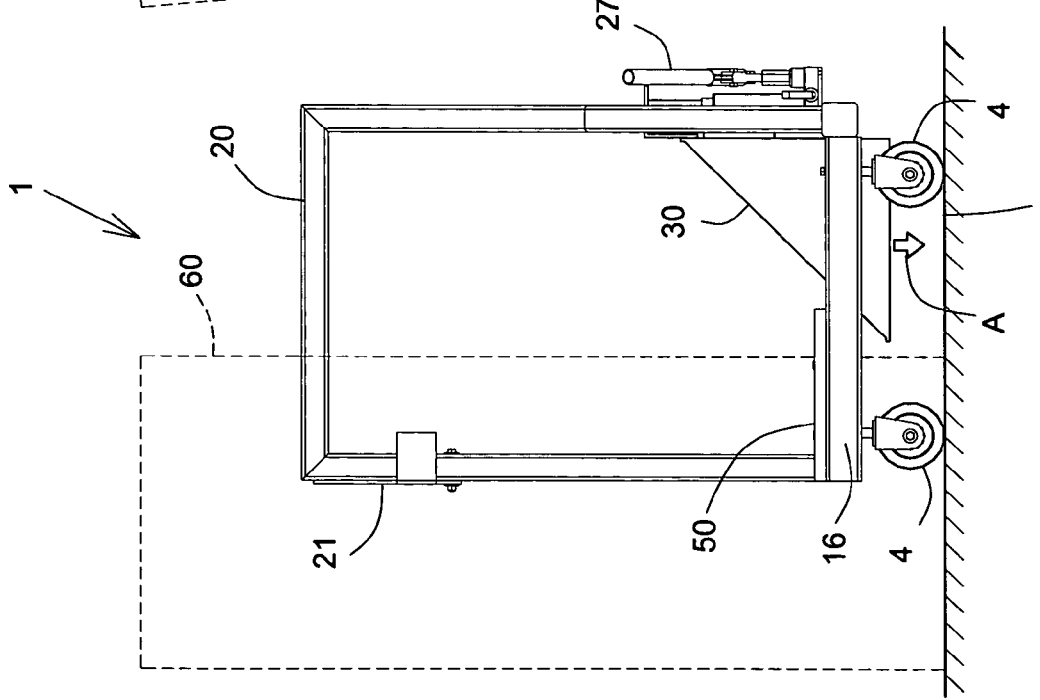

Referring now specifically to FIGS. 4, 5 and 6, operation of the dolly is described. The dolly 1 is shown in the first step in FIG. 4 in a position adjacent the front of the filing cabinet 60 and at this stage the platform 30 is lowered in the direction of the arrow A by operating the release lever 29 of the bottle jack 26 thus bringing the base support 32 of the platform into contact with the floor 70. The dolly 1 is then advanced into a position of FIG. 5 in the direction of arrow B in which the base support 32 is able to slide under the cabinet 60 upon slight tilting thereof in the direction of arrow C. Once the cabinet 60 is located on the base support and between the upstanding sides 35, the stop lever 21 is pivoted such that it locates behind the back of the cabinet 60 to restrain the cabinet from moving off the platform.

The pump 28 of the bottle jack 26 is then actuated by use of the handle 27 to elevate the platform in the direction of arrow D, the jack operating as between the lower rail 10 and the angle iron 36. Once the cabinet 60 has been elevated into the position shown in FIG. 6, the dolly 1 carrying the cabinet 60 may be wheeled away in the direction of arrow E.

The cabinet 60 is fully supported during its transport, and at its destination location the steps shown in FIGS. 4, 5 and 6 are reversed to leave the cabinet 60 firmly disposed on the floor.

The dolly of the present invention is of simple construction, is easy to use and is less onerous upon the operative. Moreover, a single operative may use the dolly with ease without the need for assistance.

The dolly of the present invention enables a more stable transportation of a filing cabinet in view or the orientation in which the cabinet is moved, and furthermore the retention stop on the handle assists in providing safety during movement.

The filing cabinet dolly provides a platform of appropriate dimension having regard to the size of the cabinet and in addition gives a facility for power assisted elevation thereof as required. These features contrast with the prior art which fails to provide either adequate support or any assisted elevation.

Whilst the invention herein disclosed has been specifically described as a 'filing cabinet dolly' it will be understood by the skilled addressee that the dolly may equally well be used for transporting other items of furniture such as book cases, and accordingly the designation as a filing cabinet dolly is not intended to be limitative.

Although the present invention has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. A filing cabinet dolly comprising a mobile framework mounted on wheels and defining an open front end for enabling access therethrough to a long side of a filing cabinet located on a floor surface, a platform associated with a closed rear end of the framework remote from the open end and provided with a slide, actuating means adapted in use to move the slide and thereby raise or lower the platform while keeping the platform substantially parallel to the floor surface with the wheels permanently in contact therewith, a handle disposed on the framework, and releasable restraining means adapted in use to retain the cabinet in situ on the platform, the platform, when in a lowered position, being substantially in contact with the floor surface.

2. A filing cabinet dolly according to claim 1 wherein the wheeled framework is constructed of lightweight material.

3. A filing cabinet dolly according to claim 1 wherein the wheeled framework is mounted on four caster wheels.

4. A filing cabinet dolly according to claim 1 wherein the closed rear end is formed of two spaced apart lower and upper horizontal rails with vertical side limbs extending therebetween to provide a generally rectangular form.

5. A filing cabinet dolly according to claim 4 wherein side bars extend orthogonally from the lower rail and terminate in free ends and an open front end of the framework is defined between the free ends of the side bars.

6. A filing cabinet dolly according to claim 5 wherein a handle is provided at one side of the framework and is upstanding from one side bar and one of the limbs forming the rear end.

7. A filing cabinet dolly according to claim 5 wherein the releasable restraining means is a pivoted lever attached to the handle and moveable between a parked non-operative position adjacent the handle and an operative restraining position orthogonal thereto, in use the lever providing a lock preventing the cabinet from moving out of its location on the dolly.

8. A filing cabinet dolly according to claim 4 wherein the rear end of the framework has two guide rods extending vertically between the rails thereof.

9. A filing cabinet dolly according to claim 8 wherein the actuating means is disposed centrally between the guide rods and the side limbs and the base of the actuating means is supported by the lower rail of the rear end of the framework.

10. A filing cabinet dolly according to claim 8 wherein the platform comprises a base support with a back upstanding therefrom with triangular side members.

11. A filing cabinet dolly according to claim 10 wherein the rear side of the back of the platform is affixed to the slide which consists of guides engaging the guide rods on the rear end of the dolly for vertical rectilinear movement in relation to the guides.

12. A filing cabinet dolly according to claim 11 wherein the back of the platform has an abutment with which the actuating means cooperates.

13. A filing cabinet dolly according to claim 12 wherein the abutment carries stop means cooperable with the relatively upper rail to limit the range of movement of the platform.

14. A filing cabinet dolly according to claim 1 wherein the actuating means is a self-contained hydraulic bottle jack.

15. A filing cabinet dolly according to claim 1 wherein the framework is provided with buffer means for positioning the filing cabinet on the platform.

16. A filing cabinet dolly according to claim 15 wherein the buffer means are wedge-shaped and are affixed side bars extending from a horizontal rail of the framework such as to extend partially into the space of the open end and are adapted in use to provide guides and support for the sides of the filing cabinet.

* * * * *